UNITED STATES PATENT OFFICE.

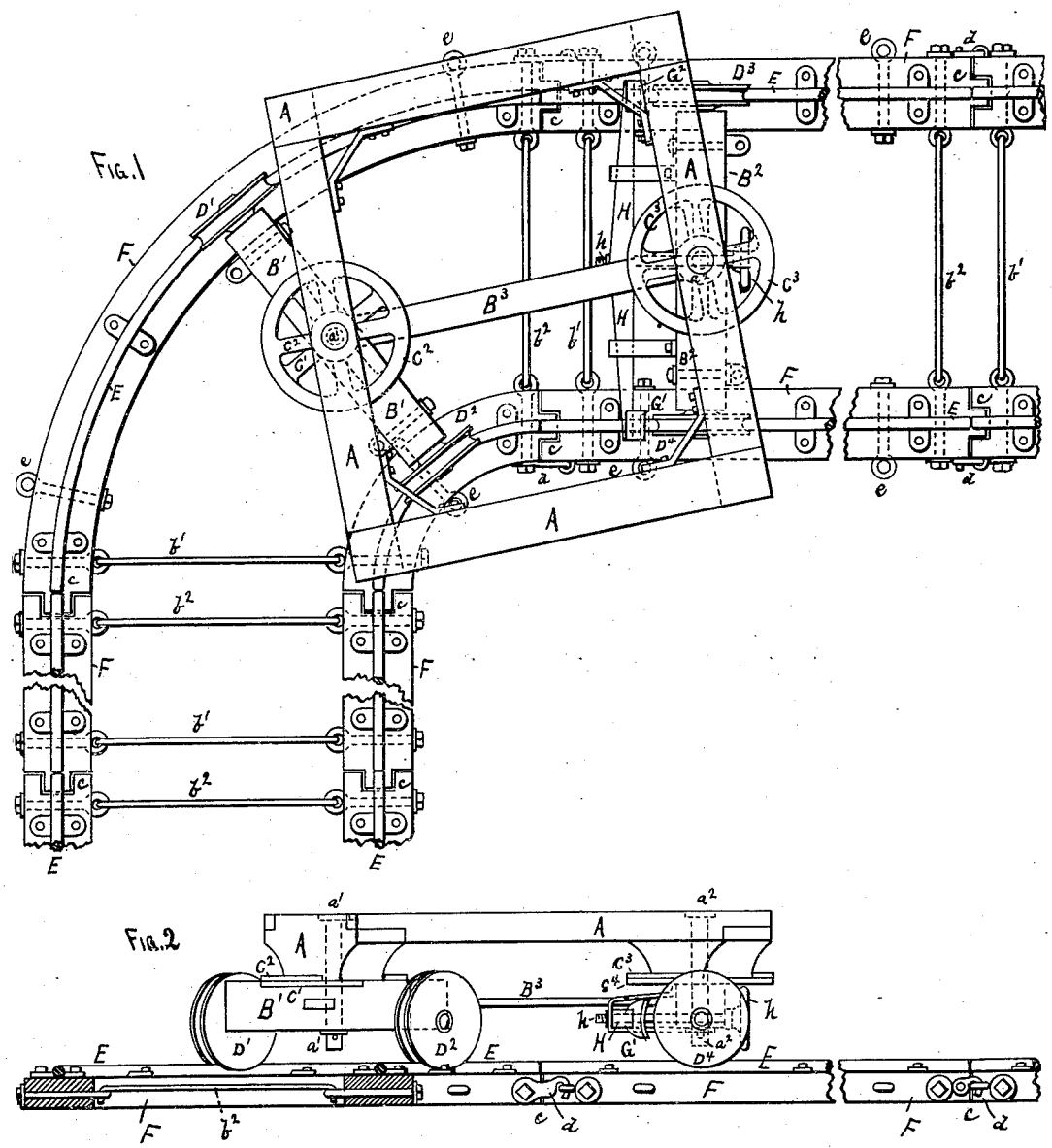

HUGO SCHROEDER, OF MINNEAPOLIS, MINNESOTA.

APPARATUS FOR MOVING HOUSES, &c.

SPECIFICATION forming part of Letters Patent No. 245,876, dated August 16, 1881.

Application filed April 21, 1881. (No model.)

*To all whom it may concern:*

Be it known that I, HUGO SCHROEDER, a subject of the Emperor of Germany, and a resident of Minneapolis, in the county of Hennepin and State of Minnesota, have made certain new and useful Improvements in Apparatus for Moving Houses and other Large Bodies, of which the following is a specification.

My invention relates to apparatus for moving houses and other large bodies; and it consists in a double-swivel truck for supporting the house or other body to be moved, and having wheels with concave treads adapted to run upon circular rails attached to portable sleepers or frames, whereby the apparatus may be moved from place to place, and in the general construction and arrangement of parts, as hereinafter set forth. I attain these objects by the use of the mechanism illustrated in the accompanying drawings, in which—

Figure 1 is a plan view, and Fig. 2 is a side view, of the truck and a curve and portions of the portable tramway.

A is a frame, suitably braced, and mounted upon two axles, $B'\ B^2$, with plates or fifth-wheels $C'\ C^2\ C^3\ C^4$ and king-bolts $a'\ a^2$, so that the axles are free to oscillate beneath the frame A, the axles being further connected and strengthened by a reach, $B^3$, pivoted by its ends with the same king-bolts $a'\ a^2$.

$D'\ D^2\ D^3\ D^4$ are wheels journaled upon the axles $B'\ B^2$, and provided with concave treads adapted to fit over circular tracks E upon sleepers F. These sleepers are made in sections, and each pair of sections connected together by tie-rods or hooks $b'\ b^2$, so that they may be readily disconnected for transportation, &c. The ends of the sleepers are formed with tongue-and-groove joints $c$, as shown, and provided with hooks $d$ or other suitable fastenings, whereby they may be coupled together.

In turning curves or corners, curved sections of the tramway will be provided with joints interchangeable, so that they may be connected to the straight sections, to turn a curve either to the right or left, and all the other joints will also be interchangeable, to enable the sections to be readily laid down and coupled together.

Eyebolts $e$ will be arranged upon the sleepers, whereby the sections may be lifted up and carried forward and laid down again, to extend the track as the truck moves forward.

$G'\ G^2$ are brake-shoes attached to a beam, H, suspended from one of the axles $B'\ B^2$, and adapted to be forced against the wheels D by a screw, $h$, or other suitable device, to brake the truck in moving downgrade, or for any other purpose.

As before stated, the tracks E are circular and the wheels D provided with concave treads to fit over them. I claim a great advantage by this arrangement, as each wheel thereby has a double flange and bears with the whole weight of the load directly downward, and side strains will only affect each wheel one-half as much as the ordinary single-flange wheel, as all side strains are borne equally by each pair of wheels, and not all by one wheel, as in the single-flange wheel. I also claim a great advantage by forming each sleeper F, with its rail E, separately from the remainder, and adapted to be connected by the joints $c$ and tie-rods $b$, so that they may be readily and quickly disconnected and packed into a small compass for transportation.

This apparatus will be found very convenient for moving houses and other large bodies, and may be made of any desired size. In using it under large buildings, &c., four of the trucks may be used with two sets of tramways.

What I claim as new is—

1. A double-swivel truck consisting of the frame A, axles $B'\ B^2$, fifth-wheels $C'\ C^2\ C^3\ C^4$, and wheels $D'\ D^2\ D^3\ D^4$, having concave treads, in combination with circular rails E, adapted to support said concave treads, and said rails supported by sleepers F, substantially as set forth.

2. The movable tramway for trucks, consisting of straight and curved sectional sleepers F, provided with tongued and grooved joints, the curved sections having interchangeable joints, whereby they are adapted to operate as set forth.

3. The sectional tramway for trucks, consisting of sleepers F, provided with eyebolts $e$, as and for the purpose set forth.

In testimony whereof I have hereunto set my hand in the presence of two subscribing witnesses.

HUGO SCHROEDER.

Witnesses:
C. N. WOODWARD,
LOUIS FEESER, Sr.